United States Patent
Damm

(10) Patent No.: US 9,140,290 B2
(45) Date of Patent: Sep. 22, 2015

(54) SELF-CENTRING CAGE NUT

(75) Inventor: Arnold Damm, Kirchberg an der Jagst (DE)

(73) Assignee: RUIA GLOBAL FASTENERS AG, Neuss (DE)

( * ) Notice: Subject to any disclaimer, the term of this patent is extended or adjusted under 35 U.S.C. 154(b) by 0 days.

(21) Appl. No.: 14/114,111

(22) PCT Filed: May 14, 2012

(86) PCT No.: PCT/DE2012/000032
§ 371 (c)(1),
(2), (4) Date: Oct. 25, 2013

(87) PCT Pub. No.: WO2012/171526
PCT Pub. Date: Dec. 20, 2012

(65) Prior Publication Data
US 2014/0056665 A1    Feb. 27, 2014

(30) Foreign Application Priority Data

Jun. 11, 2011   (DE) .................... 20 2011 101 724 U

(51) Int. Cl.
*F16B 39/284*   (2006.01)
*F16B 37/04*    (2006.01)
*F01D 5/14*     (2006.01)
*F01D 9/02*     (2006.01)

(52) U.S. Cl.
CPC .............. *F16B 37/046* (2013.01); *F01D 5/143* (2013.01); *F01D 9/02* (2013.01); *F16B 37/044* (2013.01); *F05D 2240/11* (2013.01); *F05D 2270/17* (2013.01)

(58) Field of Classification Search
CPC ............................ F16B 37/044; F16B 37/046
USPC ................... 411/111, 965, 104, 539
See application file for complete search history.

(56) References Cited

U.S. PATENT DOCUMENTS

| | | | | | |
|---|---|---|---|---|---|
| 5,054,978 | A | * | 10/1991 | Kowalski | 411/85 |
| 5,096,350 | A | * | 3/1992 | Peterson | 411/12 |
| 5,106,251 | A | * | 4/1992 | Steinbach | 411/433 |
| 5,380,136 | A | * | 1/1995 | Copple et al. | 411/183 |
| 5,405,228 | A | * | 4/1995 | Reid et al. | 411/183 |
| 5,605,353 | A | * | 2/1997 | Moss et al. | 280/784 |
| 5,630,686 | A | * | 5/1997 | Billmann | 411/112 |
| 6,146,071 | A | * | 11/2000 | Norkus et al. | 411/104 |
| 8,277,158 | B2 | * | 10/2012 | Csik et al. | 411/111 |
| 2004/0047705 | A1 | * | 3/2004 | Cutshall | 411/111 |
| 2004/0109739 | A1 | | 6/2004 | Clinch et al. | |
| 2004/0136804 | A1 | * | 7/2004 | Clinch et al. | 411/111 |
| 2004/0228701 | A1 | * | 11/2004 | Blatz | 411/190 |
| 2005/0025606 | A1 | * | 2/2005 | Toosky | 411/181 |
| 2007/0223994 | A1 | | 9/2007 | Cohen | |
| 2009/0103997 | A1 | * | 4/2009 | Csik et al. | 411/112 |
| 2009/0129885 | A1 | * | 5/2009 | Csik et al. | 411/103 |
| 2012/0313399 | A1 | * | 12/2012 | Caliskan et al. | 296/193.01 |
| 2013/0270853 | A1 | * | 10/2013 | Ramoutar et al. | 296/29 |
| 2013/0326860 | A1 | * | 12/2013 | Endt et al. | 411/104 |

FOREIGN PATENT DOCUMENTS

WO    WO 2012/084163 A1 *   6/2012

* cited by examiner

*Primary Examiner* — Roberta Delisle
(74) *Attorney, Agent, or Firm* — GableGotwals

(57) ABSTRACT

The invention relates to a cage nut (10) comprising a cage (12) with an opening and a nut body (14) that is accommodated in the cage (12) and comprises an enlarged flange (16) and a hollow cylindrical neck (18) with an internal thread (20). A spacer element (22) is arranged between the nut body (14) and the cage (12) and comprises at least one spring element (34) that acts perpendicularly in relation to the axial direction of the internal thread (20).

10 Claims, 3 Drawing Sheets

SELF-CENTRING CAGE NUT

CROSS-REFERENCE TO RELATED APPLICATIONS

This application is the United States National Phase of PCT Patent Application No. DE2012/200032 filed on 14 May 2012, which claims priority to German Patent Application No. 20 2011 101 724.2 filed 11 Jun. 2011, both of which are incorporated herein by reference.

TECHNICAL FIELD

The present invention relates to a cage nut with a nut body which is held in a cage, in which the nut body comprises a cylindrical shoulder and an enlarged holding element, and the cylindrical shoulder bears an internal thread, and extends outwards through an opening in the cage, the internal diameter of the opening being substantially greater than the external diameter of the cylindrical shoulder (of the nut), but smaller than the external dimension of the holding element (flange of the nut).

PRIOR ART

Cage nuts of this type are becoming increasingly popular in industry. However, they have two basic problems:

The purpose of such cage nuts is to compensate for mounting tolerances occurring between the components to be mounted, such as a motor or seats of a motor vehicle, and the fastening points in the vehicle body. For this purpose, the nut body has sufficient play in the cage. As a result, firstly there is the risk that the nut body in the cage may perform a tilting movement against the axial orientation of the screw. As a result, screwing the screw into the internal thread in the nut body may be made more difficult.

Furthermore, the cage nuts according to the prior art cause disturbing rattling noises between the nut body and cage if additional cage nuts for different models of a vehicle are provided on a component, and these are however not used for certain models. The unused cage nuts, which were provided to comply with the requirement of mounting various different component variants, are relatively freely movable in their cages and as a result may cause disturbing rattling noises.

Furthermore, the nut bodies of the cage nuts according to the prior art are freely movable in their cages so long as no screw has yet been screwed in. This however means that, dependent on the position of the cage during mounting, the nut body may have slipped to one side, and it then becomes difficult to locate the internal thread in the nut body with the screw or the screw bolt.

SUMMARY OF THE INVENTION

It is therefore the object of the present invention to provide a cage nut which does not cause rattling noises even in the unused state, and at the same time ensures that the nut body is always centred, independently of the installation position, but yet is movable to the required extent in order to compensate for mounting tolerances. According to the invention, this object is achieved in that a spacer element is arranged between the nut body and the cage, which element comprises at least one spring element which is effective perpendicular to the axial direction of the internal thread.

In order to improve the stability, it is particularly preferred in such case if at least two spring elements which lie opposite one another are provided.

In order to improve the protection against rattling noises, it is particularly preferred if the spring elements are made considerably more rigid in the axial direction of the internal thread than perpendicular to this axial direction. The play available until the nut body strikes the cage, and hence the undesirable rattling noises occur, is considerably less in the axial direction of the internal thread than perpendicular thereto, where a large amount of play must be provided to compensate for the manufacturing tolerances.

Particularly preferably, the spacer element is constructed from two rings arranged coaxially one within the other, which are connected by the spring element or elements, the inner ring surrounding the nut body and the outer ring being supported on the cage. In this manner, the nut body can be centred particularly accurately with respect to the cage.

Further, it is particularly preferred if the spacer element is made from electrically insulating material, preferably plastics material. In this case, the cage nut according to the invention additionally acts as an electrically insulating cage nut, which is particularly preferred precisely in the manufacture of motor vehicles, since the nut then does not become clogged with paint during electrophoretic painting, as a result of which otherwise, with non-insulating nuts, the internal thread can become unusable.

Particularly rapid and inexpensive production results if the spacer element is produced as an injection-moulded plastics part.

One particularly preferred configuration of the spring elements results if they are formed as thin strips extending in the axial direction of the internal thread.

These spring elements can then preferably be formed bent in a V-shape, the edge of the bend running parallel to the axial direction of the internal thread. In this manner, a particularly high degree of rigidity of the spring elements in the axial direction is obtained, together with a particularly great flexibility perpendicular thereto, i.e. in the direction in which the manufacturing tolerances have to be compensated.

Further, it is particularly preferred if the inner ring of the spacer element extends further into the cage than the other parts of the spacer element. In this manner, the inner ring may at the same time act as a spacer element in the axial direction, and hence avoid contact between the flange on the nut body and the cage in the axial direction too. This means that on the one hand electrical contact and on the other hand sticking of the nut body in the cage during painting are prevented.

Furthermore, it is particularly preferred if the inner ring is fastened to the shoulder with preferably three punch marks which are distributed equally over the periphery of the hollow-cylindrical shoulder. In this manner, it is possible to achieve complete prevention of loss of the cage nut before mounting at a minimal cost in terms of components (merely three individual parts).

In order to prevent the nut from disintegrating if the spring elements have been overloaded, for example during transport, and break, a locking washer may be provided between the inner ring and the punch marks, which washer has a greater external diameter than the external diameter of the outer ring.

BRIEF DESCRIPTION OF THE FIGURES OF THE DRAWINGS

The present invention will be explained in greater detail below with reference to the embodiment shown in the drawings. These show.

BEST WAY OF CARRYING OUT THE INVENTION

Figure 1:
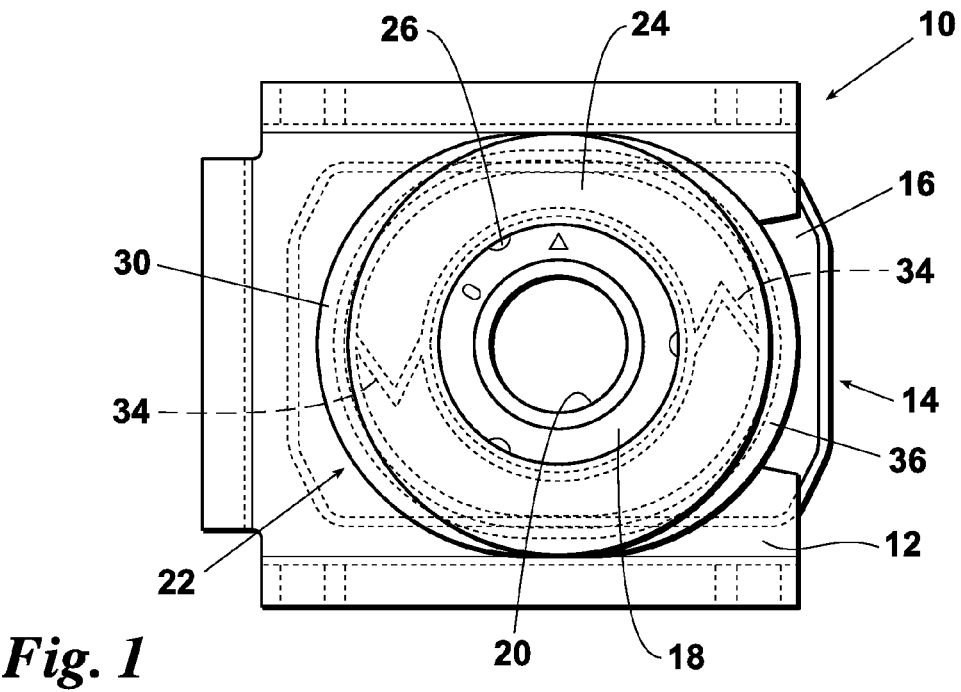
FIG. 1: a cage nut according to the invention from above.

FIG. 1 shows a cage nut 10 according to the invention from the front, that is to say viewed from the direction in which the screw bolt is usually screwed into the cage nut 10.

Components of the cage nut 10 which are not directly visible are shown here in broken lines.

As is conventional, the nut comprises a rectangular cage 12 which can be welded to the component to which the cage nut 10 according to the invention is to be attached. At the front, the cage 12 has a substantially circular opening which is broken open towards the side on one side, namely on the side on which a nut body 14 can later be inserted. The nut body 14 in such case has an enlarged flange 16 as holding element and a hollow-cylindrical shoulder 18 with an internal thread 20. The hollow-cylindrical shoulder 18 in this case extends with its axial direction in the direction of viewing of FIG. 1, that is to say, in the direction in which a screw bolt can be screwed into the cage nut according to the invention. The flange 16 extends perpendicular to this direction and has the shape of a rectangle with bevelled corners. According to the invention, a spacer element 22 is placed on the hollow-cylindrical shoulder such that it is likewise located within the opening of the cage 12. The spacer element 22 will be described in greater detail below with reference to FIGS. 2 and 3. In FIG. 1, in contrast, it can be seen how the spacer element 22 is inserted between the hollow-cylindrical shoulder 18 of the flange 16 in the opening of the cage 12. In order to secure the nut body 14 in the cage 12, there is provided outside the cage 12 a locking washer 24 which surrounds the hollow-cylindrical shoulder 18 of the nut body 14 and is fixed there by three equally spaced-apart punch marks 26. The external diameter of the locking washer 24 in this case is at least somewhat greater than the diameter of the opening in the cage 12. According to the invention, there is however also the possibility of the nut body 14 being held in the cage 12 exclusively by the spacer element 22. With such a design, the spacer element itself is then directly secured by the punch marks 26 on the hollow-cylindrical shoulder 18 of the nut body 14.

The spacer element 22 in such case is supported on the inner walls of the cage 12. It will be described in greater detail below with reference to FIGS. 2 and 3.

Figure 2:
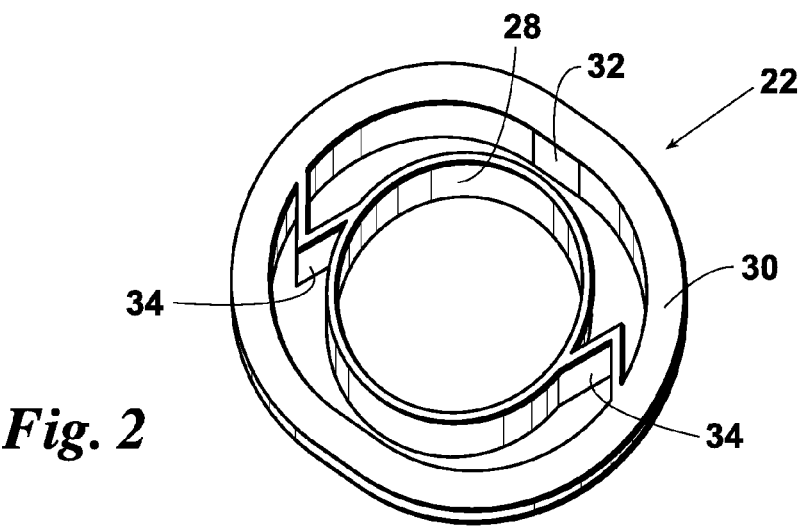
FIG. 2: a spacer element according to the invention in a three-dimensional representation.

FIG. 2 shows the spacer element 22, which in the present embodiment is formed as an injection-moulded plastics part. It comprises an inner ring 28 and an outer ring 30 which is spaced apart therefrom but arranged coaxially thereto. The outer ring 30 in this case is matched to the shape of the opening already when it is manufactured, here by being formed flattened on two opposite sides.

The inner ring 28 and the outer ring 30 of the spacer element 22 are elastically connected together by two spring elements 34. Alternatively, a different number of spring elements, for example 3 or 4, or even only one spring element, may also be provided.

Here, the spring elements 34 are arranged such that they connect the inner and the outer spacer ring 28 and 30 exactly between the flattened sections 32. In this manner, a particularly large amount of play is available for the spring elements 34.

According to the invention, here the spring elements 34 are produced in one piece with the two rings 28 and 30 of the spacer element 22 in an injection-moulding process. The spring elements 34 in this case are in the form of strips bent in a V-shape, the bend running parallel to the axial direction of the internal thread 20. In this way, the spring elements 34 have a particularly great degree of elasticity perpendicular to the axial direction of the internal thread 20, and particularly great stability in the axial direction.

Figure 3:
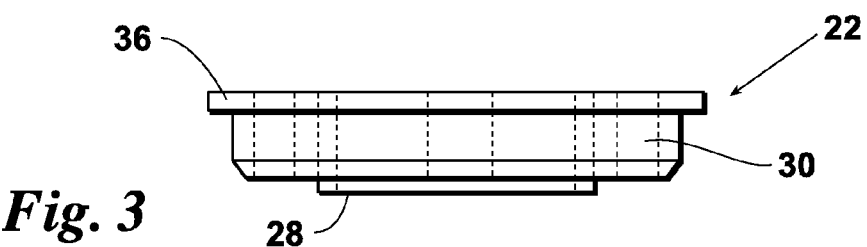
FIG. 3: the spacer element of FIG. 2 from the side.
Figure 4:
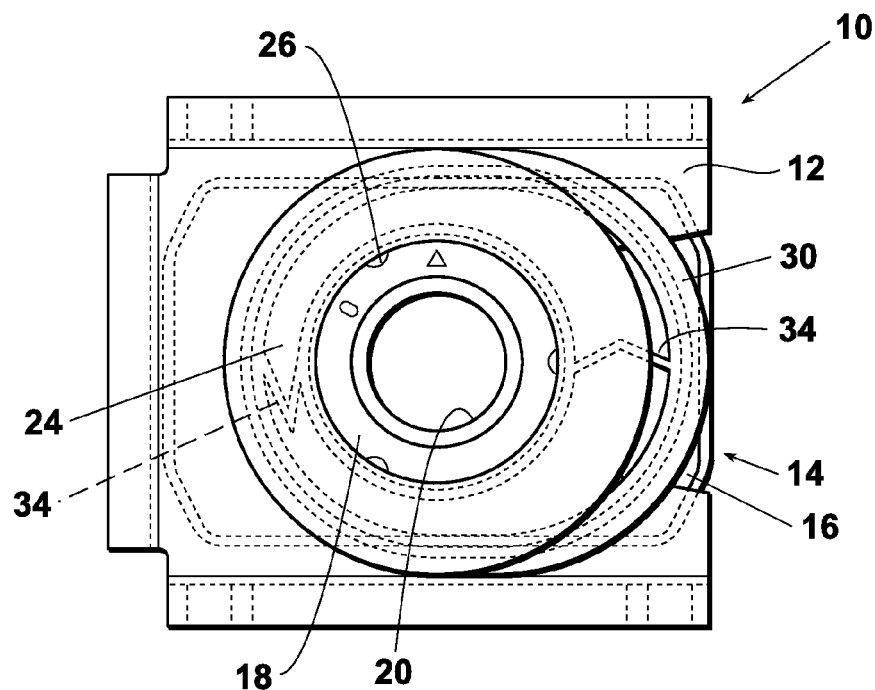
FIGS. 4 and 5: the lateral displacement in the cage nut according to the invention.
Figure 5:
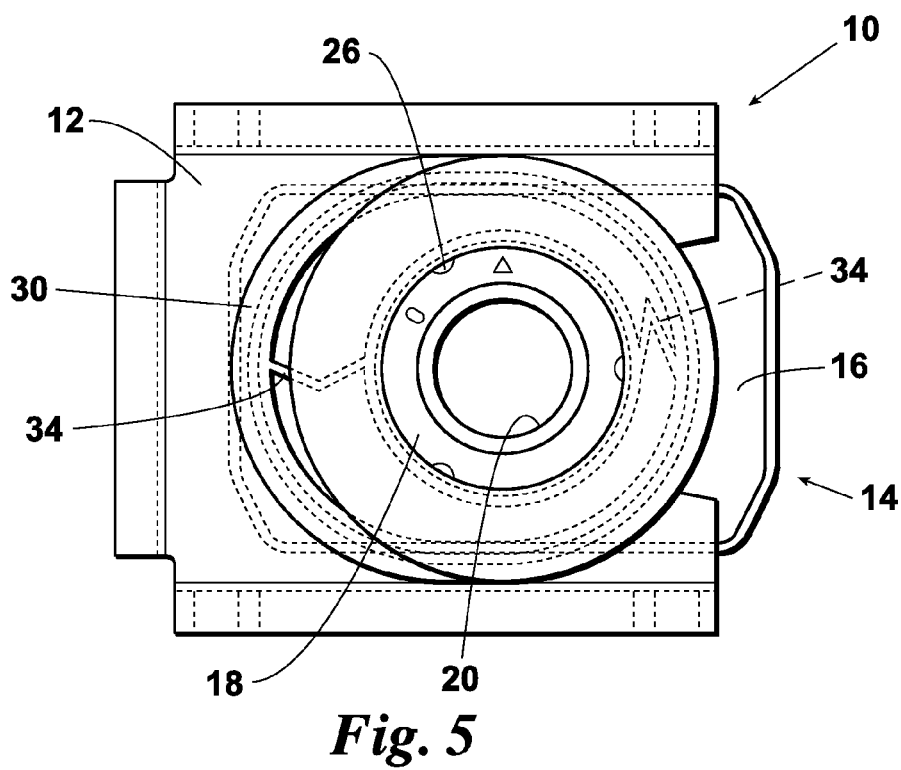
Figure 6:
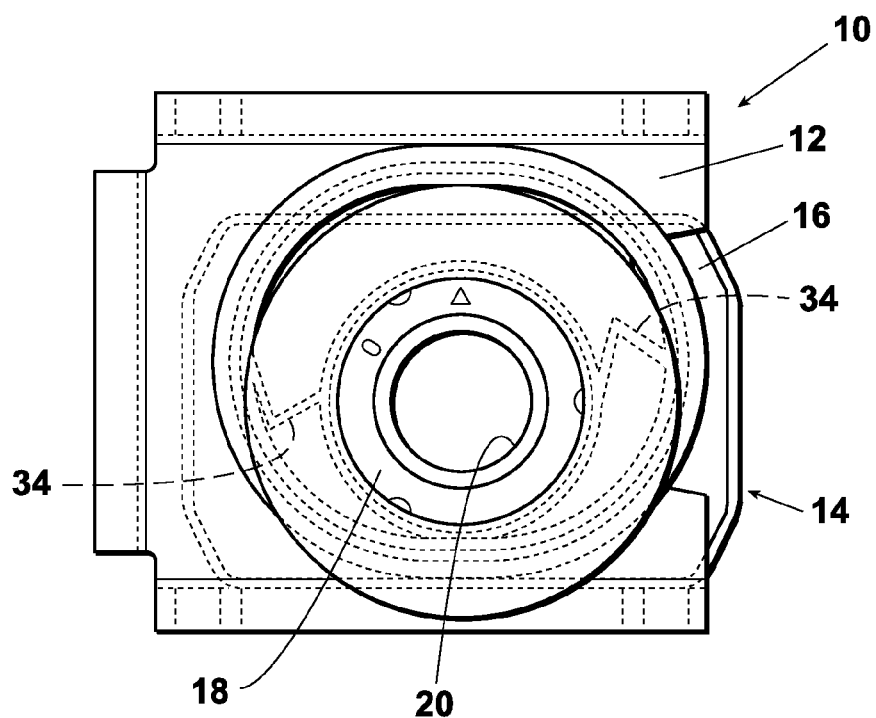
FIGS. 6 and 7: the displacement upwards and downwards in the cage nut according to the invention.
Figure 7:
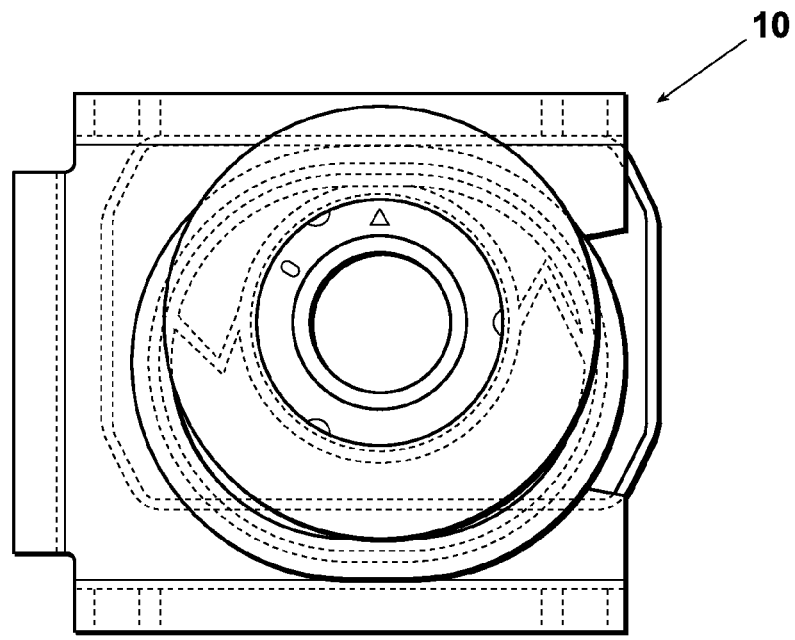

The inner ring 28 is formed as a short hollow cylinder which is coaxial to the hollow-cylindrical shoulder 18. In FIGS. 2 and 3 it extends further into the cage 12 than the other parts of the spacer element 22. In this manner, the inner ring 28 at the same time serves as a spacer in the axial direction which prevents the flange 16 from touching and/or coming into electrical contact with the cage 12. In this manner, the cage nut 10 according to the invention at the same time is an electrically insulating cage nut, which offers great advantages for example in the electrophoretic painting of components already provided with these cage nuts. Furthermore, it is thus ensured that there is always a sufficient gap between the flange 16 and the cage 12, so that these two components cannot stick together because of paint being sucked in due to a capillary effect.

FIG. 3 further clearly shows that the outer ring 30 of the spacer element 22 has an edge 36 extending outwards on its end which faces the screwing-in side of the cage nut 10. With this edge 36, the spacer element 22 is supported on the outer side of the front wall of the cage 12.

An arrangement of the spring elements 34 is particularly preferred in which the one spring element 34 in FIG. 1 points upwards with its edge and the other points downwards with its edge.

The cage 12 and nut body 14 in this case are preferably made of steel. However, also any other metal, and also a non-metallic material, may be used. In order to maintain the electrical insulation between the cage 12 and nut body 14, the locking washer 24 is preferably produced from an electrically insulating material, in particular plastics material. In such case, production likewise as an injection-moulded plastics part is recommended.

FIGS. 4, 5, 6 and 7 show the different excursions of the cage nut according to the invention for compensating for existing manufacturing tolerances. In these figures, the excursions of the spring elements 34 in each case are very clearly recognisable.

The cage nut 10 is assembled such that first the spacer element 22 is inserted into the opening of the cage 12 from the front, and then the nut body 14 is inserted into the cage 12 from the rear, with the hollow-cylindrical shoulder 18 being simultaneously pushed into the inner ring 28. The spacer element 22 is then seated in the opening of the cage 12, the edge 36 being supported externally on the front wall of the cage 12. Additionally, then the locking washer 24 can be placed on the hollow-cylindrical shoulder 18.

With the fixing of the inner ring 28 of the spacer element 22 or of the locking washer 24 on the shoulder 18 by punch marks, the mounting is then finished.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A cage nut (10) comprising:
   a cage (12) with an opening;
   a nut body (14) which is accommodated in movable manner in the cage (12) and comprising an enlarged flange (16) and a hollow-cylindrical shoulder (18) with an internal thread (20);
   a spacer element (22) being arranged between the nut body (14) and the cage (12) and comprising at least one spring element (34) which is effective perpendicular to an axial direction of the internal thread (20);
   the nut body (14) is movable with respect to the cage (12) counter to the spring force of the spring element (34) and;
   wherein a locking washer (24) is provided between the inner ring (28) and the punch marks (26), which washer has a greater external diameter than an external diameter of the outer ring (30).

2. The cage nut (10) according to claim 1 wherein at least two spring elements (34) which lie opposite one another are provided.

3. The cage nut (10) according to claim 1 wherein the at least one spring element (34) is made considerably more rigid in the axial direction of the internal thread (20) than perpendicular to the axial direction.

4. The cage nut (10) according to claim 1, wherein the spacer element (22) comprises two rings (28, 30) arranged coaxially one within the other, which are connected by the at least one spring element (34), an inner ring (28) surrounding the hollow-cylindrical shoulder (18) of the nut body (14) and an outer ring (30) being supported on the cage (12).

5. The cage nut (10) according to claim 4, wherein the inner ring (28) of the spacer element (22) extends further into the cage (12) than other parts of the spacer element (22).

6. The cage nut (10) according to claim 4 wherein the inner ring (28) is fastened to the hollow-cylindrical shoulder (18) with three punch marks (26) which are distributed equally over a periphery of the hollow-cylindrical shoulder (18).

7. The cage nut (10) according to claim 1, wherein the spacer element (22) is made from electrically insulating material.

8. The cage nut (10) according to claim 7, wherein the spacer element (22) is produced as an injection-moulded plastic part.

9. The cage nut (10) according to claim 1 wherein the at least one spring element (34) is formed as a thin strip extending in the axial direction of the internal thread (20).

10. The cage nut (10) according to claim 9, wherein the at least one spring element (34) is formed bent in a V-shape, an edge of the bend running parallel to the axial direction of the internal thread (20).

* * * * *